(12) United States Patent
Markov et al.

(10) Patent No.: US 11,922,073 B2
(45) Date of Patent: Mar. 5, 2024

(54) NON-DISRUPTIVE UPDATING OF VIRTUAL TAPE EMULATION APPLICATIONS

(71) Applicant: Dell Products, L.P., Hopkinton, MA (US)

(72) Inventors: Andrey Markov, Saint Petersburg (RU); Yuri Kotov, Saint Petersburg (RU)

(73) Assignee: Dell Products, L.P., Hopkinton, MA (US)

( * ) Notice: Subject to any disclaimer, the term of this patent is extended or adjusted under 35 U.S.C. 154(b) by 52 days.

(21) Appl. No.: 17/954,403

(22) Filed: Sep. 28, 2022

(65) Prior Publication Data

US 2023/0305755 A1 Sep. 28, 2023

(51) Int. Cl.
*G06F 3/06* (2006.01)
*G06F 9/455* (2018.01)

(52) U.S. Cl.
CPC .......... *G06F 3/0664* (2013.01); *G06F 3/0617* (2013.01); *G06F 3/0686* (2013.01); *G06F 9/45558* (2013.01); *G06F 2009/45579* (2013.01); *G06F 2009/45583* (2013.01)

(58) Field of Classification Search
USPC ......................................................... 711/111
See application file for complete search history.

(56) References Cited

U.S. PATENT DOCUMENTS

| | | | | |
|---|---|---|---|---|
| 10,235,086 B1 * | 3/2019 | McCloskey | ........... | G06F 3/0605 |
| 2017/0123940 A1 * | 5/2017 | Gorrell | ................. | G06F 3/0686 |
| 2019/0339896 A1 * | 11/2019 | McCloskey | ........... | G06F 3/0664 |
| 2021/0026552 A1 * | 1/2021 | Ashkadov | ............. | G06F 3/0659 |
| 2022/0137885 A1 * | 5/2022 | Zakharkin | ............. | G06F 3/0686 |
| | | | | 711/162 |

\* cited by examiner

*Primary Examiner* — Than Nguyen
(74) *Attorney, Agent, or Firm* — Anderson Gorecki LLP

(57) ABSTRACT

A Virtual Tape Emulation (VTE) application is able to be updated without disrupting IO operations by hosts on a set of virtual tape drives managed by the VTE application. When an old VTE application is to be replaced with a new VTE application, the new VTE application is provided with the same configuration information as the old VTE application. Each time a host unmounts a virtual tape from a virtual tape drive on the old VTE application, device management for that virtual tape drive is migrated from the old VTE application to the new VTE application. Specifically, path and channel information for the virtual tape drive is transferred to the new VTE application, and applied by the new VTE application to a respective device on the new VTE application. Once device management for all virtual tape drives has been transferred, the old VTE application is terminated.

19 Claims, 5 Drawing Sheets

NON-DISRUPTIVE UPDATING OF VIRTUAL TAPE EMULATION APPLICATIONS

CROSS-REFERENCE TO RELATED APPLICATIONS

This application claims priority to Russian Patent Application 2022108125 filed Mar. 28, 2022, the content of which is hereby incorporated herein by reference.

FIELD

This disclosure relates to computing systems and related devices and methods and, more particularly, to a method and apparatus for enabling a virtual tape emulation application, executing in a virtual tape emulator of a virtual tape engine, to be updated in a manner that is non-disruptive to a set of hosts that are using the virtual tape emulation application to process workload on a set of virtual tapes.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

A Virtual Tape Emulation (VTE) application is able to be updated without disrupting IO operations by hosts on a set of virtual tape drives managed by the VTE application. When responsibility for a set of virtual tape drives is to be transitioned from an old VTE application to a new VTE application, the new VTE application is provided with the same configuration information as the old VTE application. Each time a host unmounts a particular virtual tape on the old VTE application, a device management process for the virtual tape drive is migrated from the old VTE application to the new VTE application. Specifically, path and channel information for the respective virtual tape drive on the old VTE application is transferred to the new VTE application, and applied by the new VTE application to a respective virtual tape drive on the new VTE application. Once device management for all virtual tape drives has been transferred to the new application, the old application is terminated.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g., and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
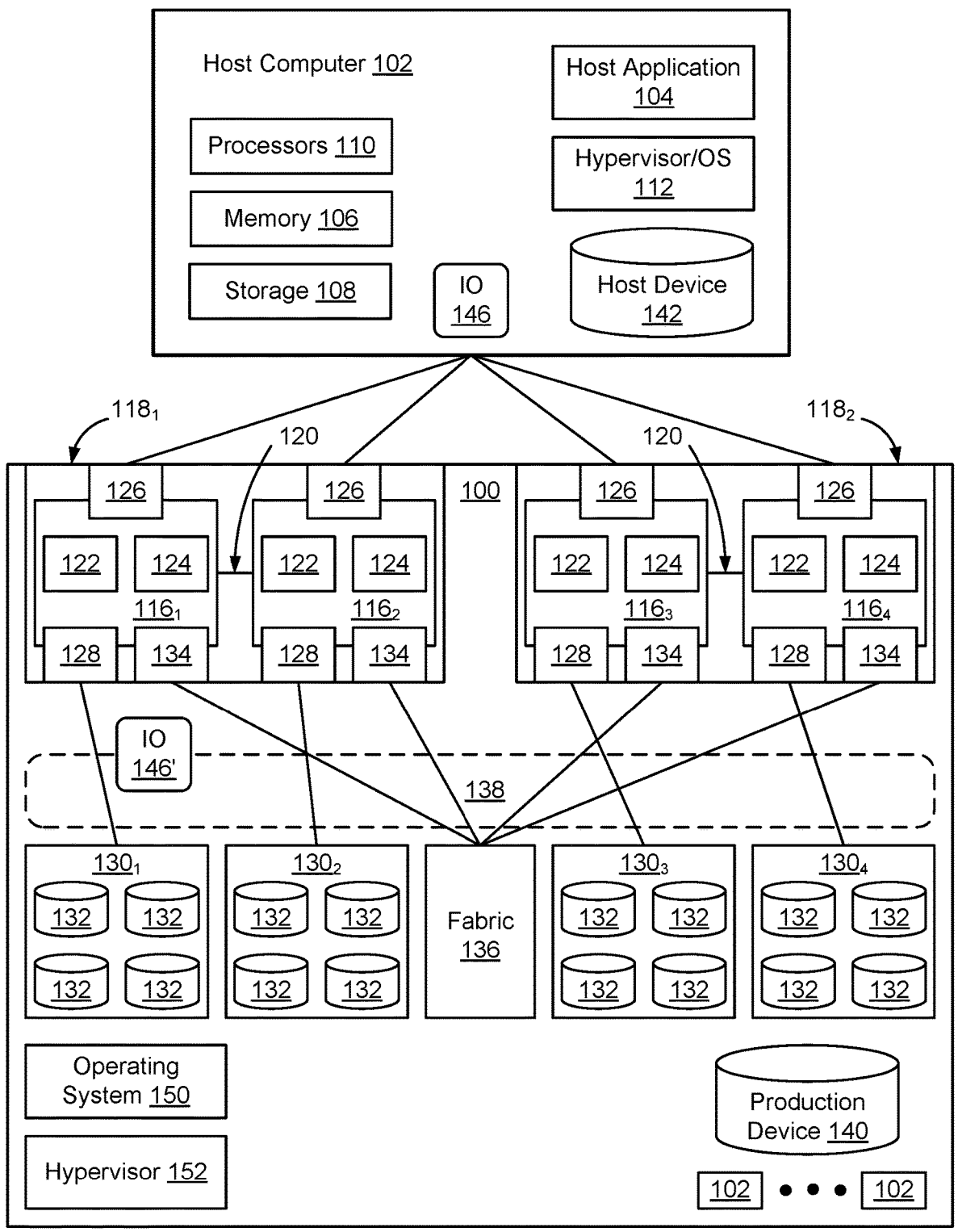
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile memory 124. The processors 122 may include a plurality of multi-core processors of one or more types, e.g., including multiple CPUs, GPUs, and combinations thereof. The local volatile memory 124 may include, for example and without limitation, any type of RAM. Each compute node 116 may also include one or more front end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132. A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$, using a PCIe (Peripheral Component Interconnect Express) bus or may be connected to the compute nodes $116_1$-$116_4$, for example, by an IB (InfiniBand) bus or fabric.

In some embodiments, each compute node 116 also includes one or more channel adapters 134 for communicating with other compute nodes 116 directly or via an interconnecting fabric 136. An example interconnecting fabric 136 may be implemented using InfiniBand. Each compute node 116 may allocate a portion or partition of its respective local volatile memory 124 to a virtual shared "global" memory 138 that can be accessed by other compute nodes 116, e.g., via DMA (Direct Memory Access) or RDMA (Remote Direct Memory Access). Shared global memory 138 will also be referred to herein as the cache of the storage system 100.

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata that indicates, among various things, mappings between the production device 140 and the locations of extents of host application data in the virtual shared global memory 138 and the managed drives 132. In response to an IO (Input/Output command) 146 from the host application 104 to the host device 142, the hypervisor/OS 112 determines whether the IO 146 can be serviced by accessing the host volatile memory 106. If that is not possible then the IO 146 is sent to one of the compute nodes 116 to be serviced by the storage system 100.

In the case where IO 146 is a read command, the storage system 100 uses metadata to locate the commanded data, e.g., in the virtual shared global memory 138 or on managed drives 132. If the commanded data is not in the virtual shared global memory 138, then the data is temporarily copied into the virtual shared global memory 138 from the managed drives 132 and sent to the host application 104 by the front-end adapter 126 of one of the compute nodes $116_1$-$116_4$. In the case where the IO 146 is a write command, in some embodiments the storage system 100 copies a block being written into the virtual shared global memory 138, marks the data as dirty, and creates new metadata that maps the address of the data on the production device 140 to a location to which the block is written on the managed drives 132.

Some hosts, such as mainframe computers 205, are configured to store data using magnetic tape data storage. Magnetic tape data storage is a system for storing digital information on magnetic tape using digital recording. Tape was an important medium for primary data storage in early computers. Conventionally, tape drives would be used to write data on customer mainframe computers $205_1$, $205_2$, to physical tapes. Although other forms of storage have been developed which don't involve physical tapes, tape data storage is still used for system backup, data archive, data exchange, and for protection of data against a cyber-attack. When data is written to a tape drive, the mainframe computer outputs data using a format developed to be used to store tape data, such as AWSTAPE format. This type of data format, for example, includes a tape mark at the end of each file, and two successive tape marks at the end of the recorded data.

Virtual tape engines have been developed that emulate tape drives. Instead of storing the data on physical tapes, however, the virtual tape engines receive tape formatted data from the hosts and store the virtual tape file systems in storage resources provided by a back-end storage system 100. If the customer mainframe computer 205 subsequently needs to read data from one of the emulated tapes, the virtual tape engine 200 formats the data using the expected format, such as AWSTAPE, and provides the data back to the customer mainframe 205. For example, as shown in FIG. 2, a virtual tape engine 200 may be interposed between the customer mainframe computers 205 and one or more storage systems 100.

Figure 2:
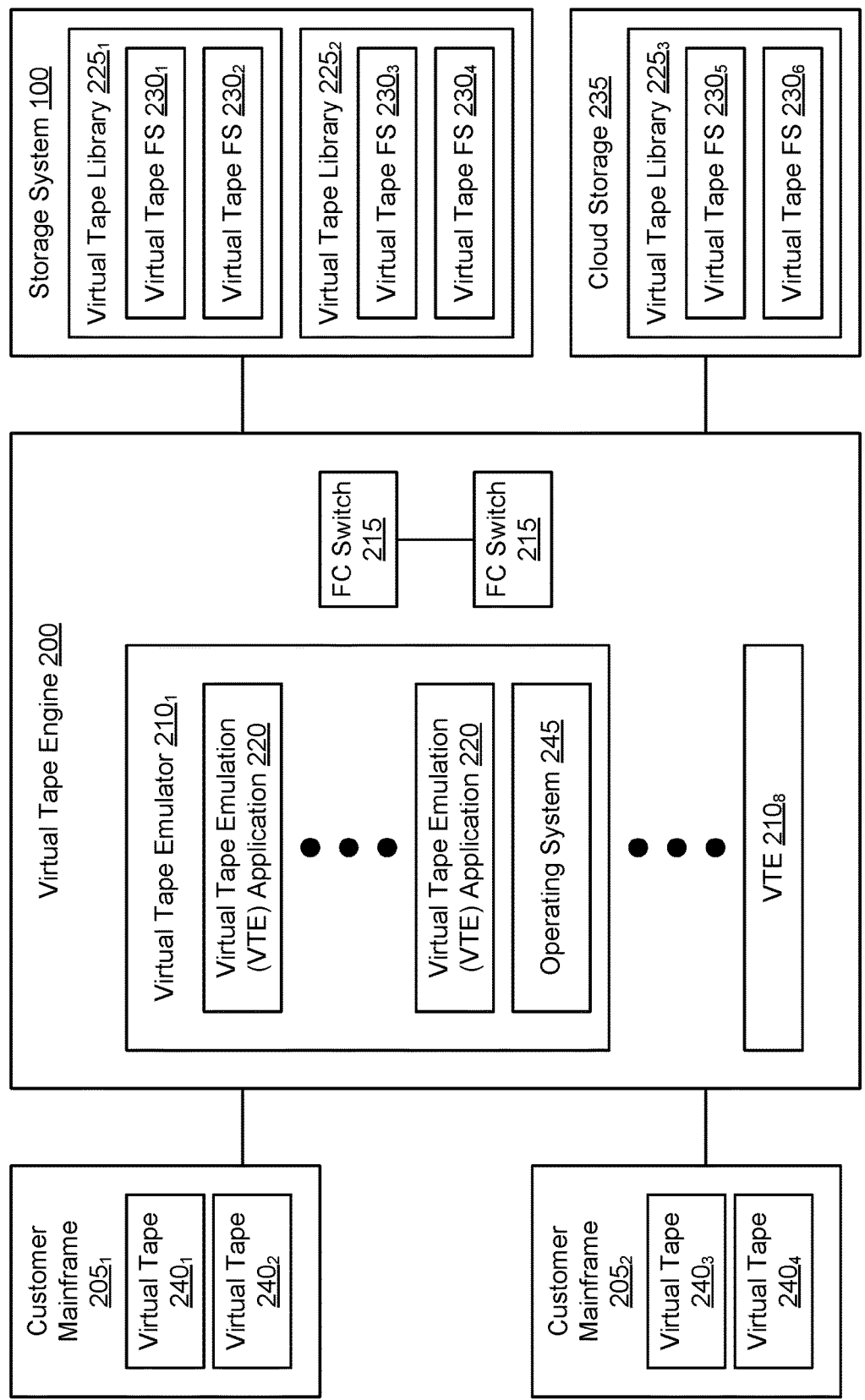
FIG. 2 is a functional block diagram of a set of customer mainframe computers connected to a virtual tape engine configured to emulate tape drives and store tape data on back-end storage systems, according to some embodiments.

FIG. 2 is a functional block diagram of a set of customer mainframe computers $205_1$, $205_2$, connected to a virtual tape engine 200 configured to emulate tape drives and store tape data on one or more back-end storage systems 100 or cloud storage 235, according to some embodiments. The virtual tape engine 200 emulates tape drives so that the customer mainframe computers $205_1$, $205_2$, operate in a conventional manner to write data to the virtual tape engine 200, which appears to the customer mainframe $205_1$, $205_2$ as a conventional tape drive. Specifically, each customer mainframe computer $205_1$, $205_2$ will have one or more virtual tapes $240_1$, $240_2$, $240_3$, $240_4$, that are able to be used by the customer mainframes $205_1$, $205_2$ to store data. When the virtual tapes $240_1$, $240_2$, $240_3$, $240_4$, are used to write data to the virtual tape engine 200, the data output by the mainframe computers $205_1$, $205_2$ is formatted using a tape data format such as AWSTAPE that would conventionally be used to store the file systems on magnetic tape.

The virtual tape engine 200 has a set of virtual tape emulators $210_1$-$210_8$ that emulate tape drives, such as IBM tape drives. The virtual tape emulators $210_1$-$210_8$ interface with the customer mainframe computers and direct tape data to and from back-end storage, which may be provided by one or more attached storage systems 100 or may be provided using cloud storage 235. Data is written to back-end storage and stored in a network file system, for example over fiber channel switches 215. Although FIG. 2 shows a virtual tape engine 200 with 8 virtual tape emulators (VTEs) $210_1$-$210_8$, the virtual tape engine 200 may have a different number of virtual tape emulators 210 depending on the implementation. In some embodiments, each virtual tape emulator 210 is a separate physical component within virtual tape engine 200.

Each virtual tape emulator 210 includes one or more instances of virtual tape emulation application 220 executing in the context of an operating system 245. In some embodiments, the virtual tape emulation application 220 receives and interprets channel command words from the customer mainframe computers 205, sends and receives the virtual tape data records, reads and writes corresponding disk data in response to the command channel words, and sends and receives control information to and from the customer mainframe computers 205 in response to the command channel words.

Tape file systems 230 are organized by the virtual tape emulation application 220 in virtual tape libraries 225. For example, as shown in FIG. 2, storage system 100 has been configured to maintain two virtual tape libraries $225_1$, $255_2$, and cloud storage 235 has been configured to maintain a third virtual tape library $225_3$. Each virtual tape library 225 has one or more virtual tape file systems 230.

There are times when a Virtual Tape Emulation (VTE) application 220 needs to be updated, for example to replace the current version of the virtual tape emulation application 220 with a new version of the virtual tape emulation application 220. As is well known, software applications are frequently updated for a variety of reasons, such as to fix known bugs, add functionality, increase security, etc. Unfortunately, updating a VTE application 220 conventionally required IO workload from the computer mainframe computers 205 to be stopped. Specifically, conventionally updating a VTE application 220 required the VTE application 220 to be turned off, a new instance of the VTE application be loaded and configured, and then the new instance of the VTE application 220 could be used to begin processing IO workload from the computer mainframe computers on virtual tapes 240. This process is disruptive, since it prevents the customer mainframe computers from issuing IO workload on all of the virtual tapes 240 that are supported by the instance of the VTE application that is to be updated. Since a given VTE application 220 may have hundreds of virtual tape drives that are used by customer mainframe computers 205 to access tape data, updating the VTE application 220 in a disruptive manner is undesirable.

According to some embodiments, a Virtual Tape Emulation (VTE) application is able to be updated without disrupting IO operations by customer mainframes 205 on a set of virtual tape drives managed by the VTE application. When responsibility for a set of virtual tape drives is to be transitioned from an old VTE application to a new VTE application, the new VTE application is provided with the same configuration information as the old VTE application. Each time a customer mainframe 205 unmounts a particular tape from a virtual tape drive on the old VTE application, that virtual tape drive is migrated from the old VTE application to the new VTE application. Specifically, path and channel information for the respective virtual tape drive on the old VTE application is transferred to the new VTE application, and applied by the new VTE application to a respective virtual tape drive on the new VTE application. Once all device pairs have transferred virtual device management to the new application, the old application is terminated.

Figure 3:
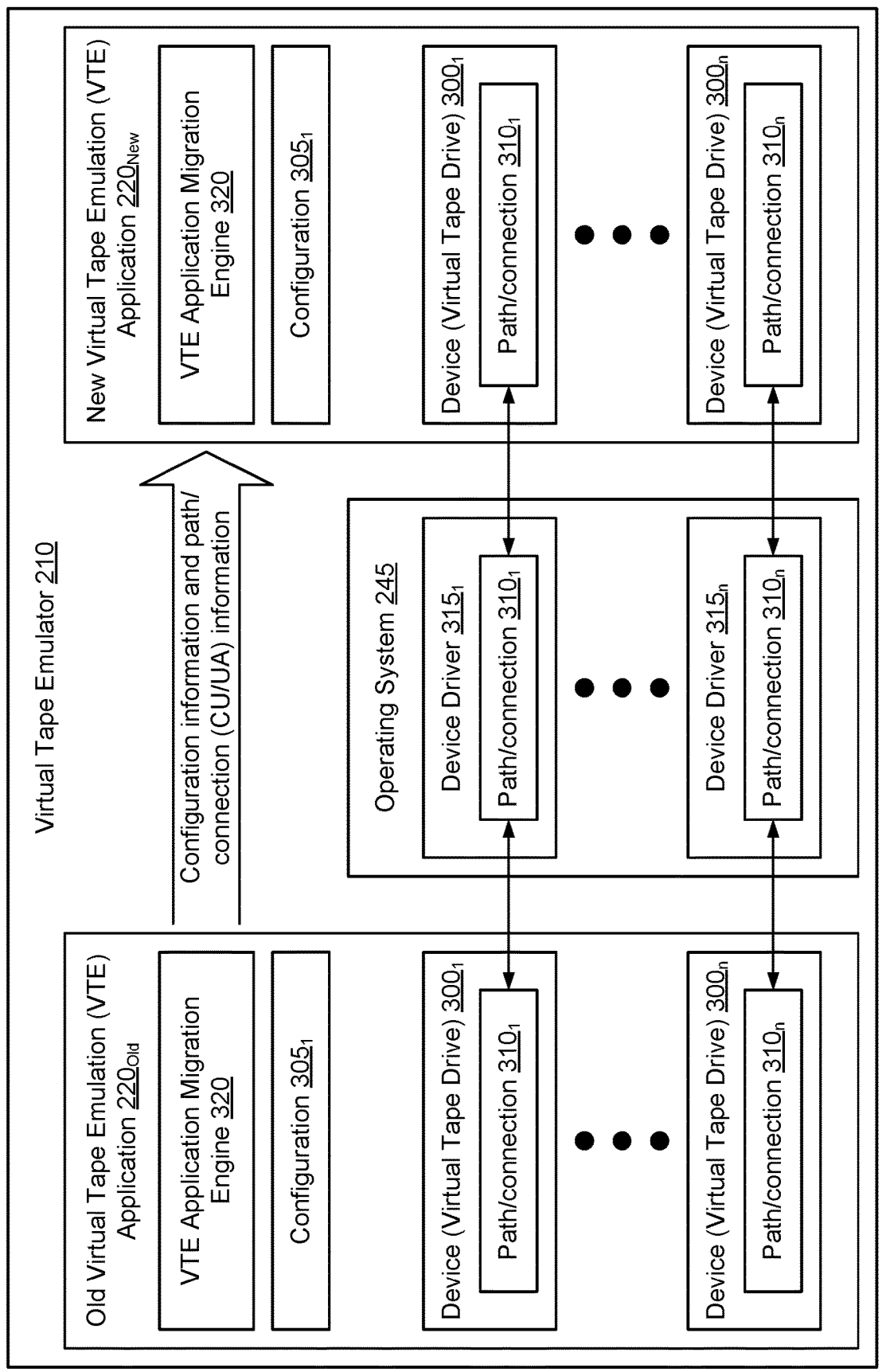
FIG. 3 is a functional block diagram of an example virtual tape emulator, having an old instance of virtual tape emulation application that is to be updated to a new instance of virtual tape emulation application in a manner that is non-disruptive to the set of customer mainframe computers, according to some embodiments.

FIG. 3 is a functional block diagram of an example virtual tape emulator, having an old instance of virtual tape emulation application $220_{Old}$ that is to be updated to a new instance of virtual tape emulation application $220_{New}$ in a manner that is non-disruptive to the set of customer mainframe computers, according to some embodiments. As shown in FIG. 3, in some embodiments the old VTE application $220_{Old}$ has configuration information 3051 and a set of devices (virtual tape drives) 300 that are used to by customer mainframe computers 205 to read and write data to tapes 240. In some embodiments, the VTE application $220_{Old}$ has multiple devices (virtual tape drives) 300. Customer mainframe computers mount (load) virtual tapes 240 to the virtual tape drives to read and write data to the virtual tapes 240. A given VTE application $220_{Old}$ might support hundreds of virtual tapes 240, depending on the implementation. As used herein, the term "device" is used to refer to a virtual tape drive.

Each device (virtual tape drive) is associated with a path/connection that is used by the VTE application $220_{Old}$ to communicate with a respective device driver 315 in operating system 245. For example, the path/connection might specify a Control Unit (CU) and Unit Address (UA) used to process workload from a particular virtual tape drive.

According to some embodiments, the old VTE application $220_{Old}$ includes a VTE application migration engine 320 configured to non-disruptively enable migration of responsibility for virtual tape drives from the old VTE application $220_{Old}$ to a new instance of VTE application $220_{New}$, which does not require the old instance of the VTE application $220_{Old}$ to stop processing workloads on virtual tapes 240 from the customer mainframe computers 205 and does not require disabling IO processing on the customer mainframe computers 205.

In some embodiments, at the start of the transition process, the old VTE application $220_{Old}$ remains responsible for handling customer mainframe 205 workloads on any virtual tapes that are currently mounted on virtual tape drives on the old VTE application $220_{Old}$. Any virtual tape drives that do not currently have a virtual tape mounted are migrated from the old VTE application $220_{Old}$ to the new VTE application $220_{New}$. Customer mainframes 205 periodically unmount virtual tapes from the virtual tape drives. As the virtual tapes are unmounted by the customer mainframe 205 on the old VTE application 22001d, the unused virtual tape drives are migrated to the new VTE application $220_{New}$. When the customer mainframe 205 subsequently mounts a virtual tape to the migrated virtual tape drive, the new VTE application $220_{New}$ will process workload on the virtual tape drive, thus enabling virtual device management for the virtual tape drive to transition from the old VTE application $220_{Old}$ to the new VTE application $220_{New}$ in a manner that is non-disruptive to the customer mainframe computers 205. The process iterates for each virtual tape drive, migrating each virtual tape drive when the virtual tape drive is not being used by a customer mainframe 205, until the new VTE application $220_{New}$ has assumed responsibility for all virtual tape drives and the old VTE application $220_{Old}$ no longer has responsibility for any virtual tape drives, at which point the old VTE application $220_{Old}$ may be shut down.

Figure 4:
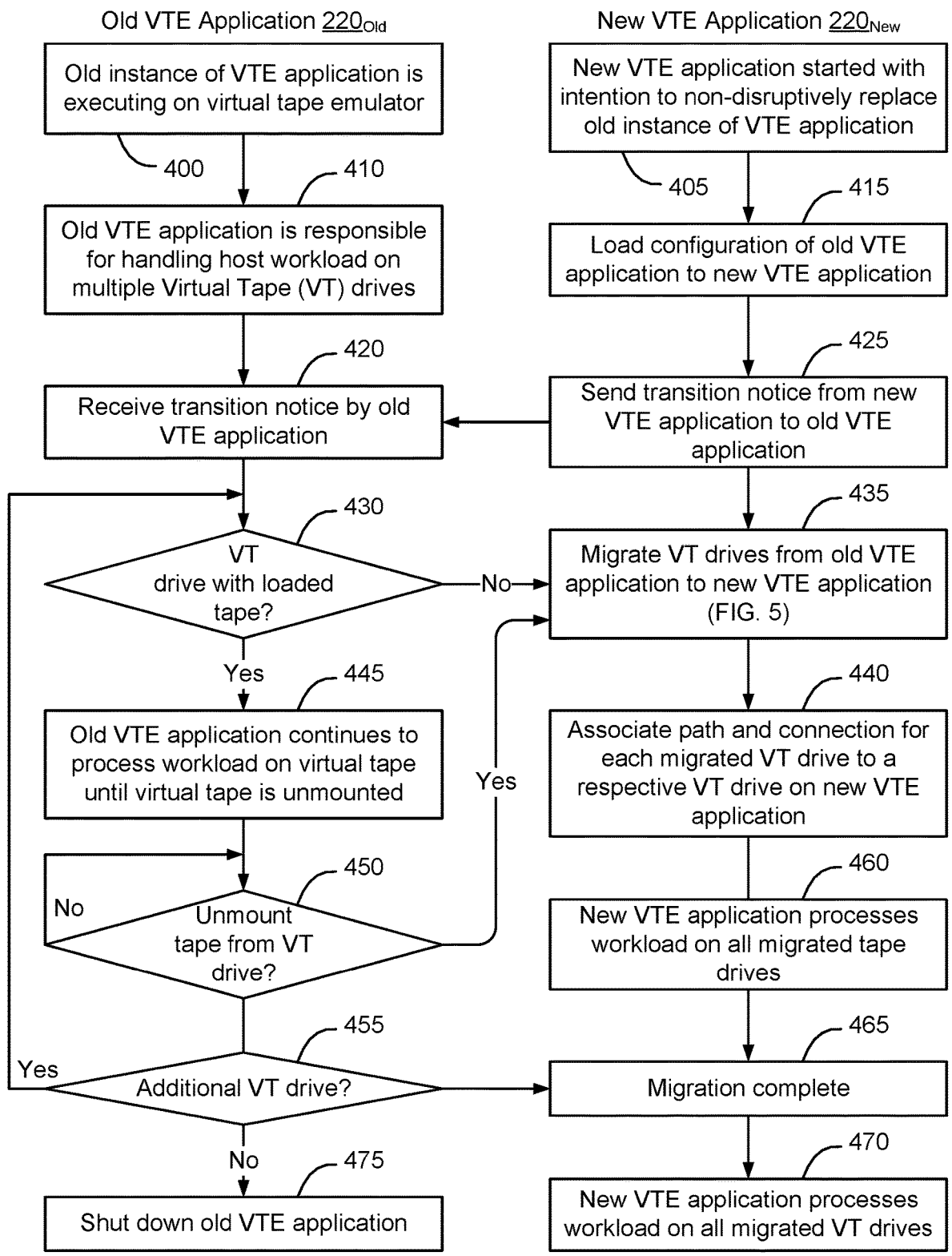
FIG. 4 is a flow chart of a process of updating of a virtual tape emulation application in a non-disruptive manner, according to some embodiments.

FIG. 4 is a flow chart of a process of updating of a virtual tape emulation application 220 in a non-disruptive manner, according to some embodiments. In FIG. 4, actions/operations of the old VTE application $220_{Old}$ are shown on the left-hand side, and actions/operations of the new VTE application $220_{New}$ are shown on the right-hand side. Arrows that point left and right indicate communication between the VTE application migration engines 320 of each of the old and new VTE applications.

As shown in FIG. 4, at the beginning of a non-disruptive transition process, an old instance of the VTE application $220_{Old}$ is executing on a virtual tape emulator 210 (block 400). At this point, the old VTE application $220_{Old}$ is responsible for handling workload on a set of virtual tape drives, and is processing the workloads on the virtual tape drives (block 410).

A new VTE application $220_{New}$ is started with the intention to non-disruptively replace the old instance of the VTE application $220_{Old}$ (block 405). The configuration 305 of the old VTE application $220_{Old}$ is loaded to the new VTE application $220_{New}$ (block 415), and the new VTE application $220_{New}$ sends a transition notice to the old VTE application $220_{Old}$ (block 425).

When the old VTE application $220_{Old}$ receives the transition notice (block 420), the old VTE application $220_{Old}$ starts a transition process during which responsibility for each of the virtual tape drives will be migrated from the old VTE application $220_{Old}$ to the new VTE application $220_{New}$. Specifically, in some embodiments, as virtual tapes are unmounted from virtual tape drives by the customer mainframe 205 on the old VTE application $220_{Old}$, responsibility for the virtual tape drives will be migrated from the old VTE application $220_{Old}$ to the new VTE application $220_{New}$. Since the migration occurs on individual virtual tape drives during periods of time when the virtual tape drives are not being used (have no mounted virtual tape), migration of virtual tape drive device management processes can occur when the virtual tape drives are not being used by the customer mainframes 205. Thus, the migration is able to be implemented in a non-disruptive manner to the customer mainframe 205. By transferring path and connection information of each virtual tape drive 300 from the old VTE application $220_{Old}$ to the new VTE application $220_{New}$ during the migration process, the new VTE application $220_{New}$ is able to seamlessly assume responsibility for the workload on the virtual tape drive when a virtual tape 240 is subsequently mounted to the migrated virtual tape drive 300 by the customer mainframe 205.

In some embodiments, as shown in FIG. 4, when the old VTE application $220_{Old}$ receives the transition notice (block 420) the old VTE application $220_{Old}$ determines if there are any virtual tape drives that currently have a loaded (mounted) virtual tape (block 430). Any virtual tape drives that is currently unused (does not have a tape mounted) is a candidate to be migrated to the new VTE application $220_{New}$. However, any virtual tape drive that currently has a loaded tape will continue to handle workload on the loaded virtual tape. Accordingly, in some embodiments, a determination is made, for a particular virtual tape drive, if a virtual tape is mounted to the virtual tape drive (block 430). If a tape is not mounted to the virtual tape drive (a determination of NO at block 430) the virtual tape drive is migrated to the new VTE application $220_{New}$ (block 435). If a tape is mounted to the virtual tape drive (a determination of YES at block 430) the old VTE application $220_{Old}$ continues to process workload on the currently mounted tape (block 445) until the tape is unmounted (block 450). When the virtual tape is unmounted (a determination of YES at block 450), the unused VT drive is migrated from the old VTE application $220_{Old}$ to the new VTE application $220_{New}$. This process iterates for all virtual tape (VT) drives 300 (block 455) until device management processes have been migrated for all virtual tape drives 300.

In some instances, the old VTE application $220_{Old}$ will have one or more virtual tape drives that currently have a virtual tape mounted. In many instances, the old VTE application $220_{Old}$ might have hundreds of virtual tape drives that currently have virtual tapes mounted. To prevent the transition from disrupting the customer mainframes 205 from being able to use these virtual tapes, in some embodiments the old VTE application $220_{Old}$ continues to process workload on all virtual tape drives that currently have virtual tapes mounted (block 440) during the transition process.

The VTE application migration engine 320 on the old VTE application $220_{Old}$ then waits for customer mainframes 205 to unmount each of the currently mounted virtual tapes (block 450). It is normal for customer mainframes 205 mount (load) a virtual tape to a virtual tape drive, read/write to the virtual tape, and then unmount the virtual tape from the virtual tape drive. When the VTE application migration engine detects that a customer mainframe 205 has unmounted a virtual tape from a particular virtual tape drive (a determination of YES at block 455), the old VTE application $220_{Old}$ migrates the device management process for that particular virtual tape drive to the new VTE application $220_{New}$ (block 435).

As device management processes associated with virtual tape drives are migrated from the old VTE application $220_{Old}$ to the new VTE application $220_{New}$, the old VTE application $220_{Old}$ determines whether device management processes for all virtual tape drives have been migrated (block 455). If the old VTE application $220_{Old}$ is still responsible for one or more virtual tape drives (a determination of YES at block 455) the process returns to block 430, and the old VTE application $220_{Old}$ continues to process workload on all virtual tape drives that currently have a mounted virtual tape (block 445). Once the old VTE application $220_{Old}$ is no longer responsible for any virtual tape drives (a determination of NO at block 460), all device management processes for all virtual tape drives have been non-disruptively migrated from the old VTE application $220_{Old}$ to the new VTE application $220_{New}$, and the old VTE application $220_{Old}$ can be shut down (block 470).

Each time a device management process for a virtual tape drive is migrated from the old VTE application $220_{Old}$, the path and connection information used by the old VTE application $220_{Old}$ is sent to the new VTE application $220_{New}$. The new VTE application $220_{New}$ associates this path and connection information with a particular device 300 on the new VTE application $220_{New}$ (block 445). When the customer mainframe 205 subsequently mounts a virtual tape to the migrated virtual tape drive, the device driver 315 uses the path/connection information to forward workload on the virtual tape drive to the new VTE application $220_{New}$, and the new VTE application $220_{New}$ processes workload on all the migrated virtual tapes (block 460). Once migration is complete (block 465) the new VTE application $220_{New}$ is responsible for all virtual tapes 240, and processes workload on all of the virtual tapes 240 (block 470). Optionally, as shown in FIG. 4, when the old VTE application $220_{Old}$ determines that all virtual tape drives have been migrated (a determination of NO at block 455) the old VTE application $220_{Old}$ messages the new VTE application $220_{New}$ to indicate to the new VTE application $220_{New}$ that the transition process is complete.

In some instances, a particular host may never unmount a particular virtual tape. For example, an unusual condition might exist at the customer mainframe 205 that would prevent the customer mainframe 205 from unmounting a particular virtual tape from a particular virtual tape drive. In some embodiments, if the transition process takes longer than a threshold amount of time, the customer mainframe 205 may be notified to request that particular remaining virtual tapes be manually unmounted for a short period of time to enable the transition process to complete and to allow the device management processes for the virtual tape drives to be migrated to the new VTE application $220_{New}$.

Figure 5:
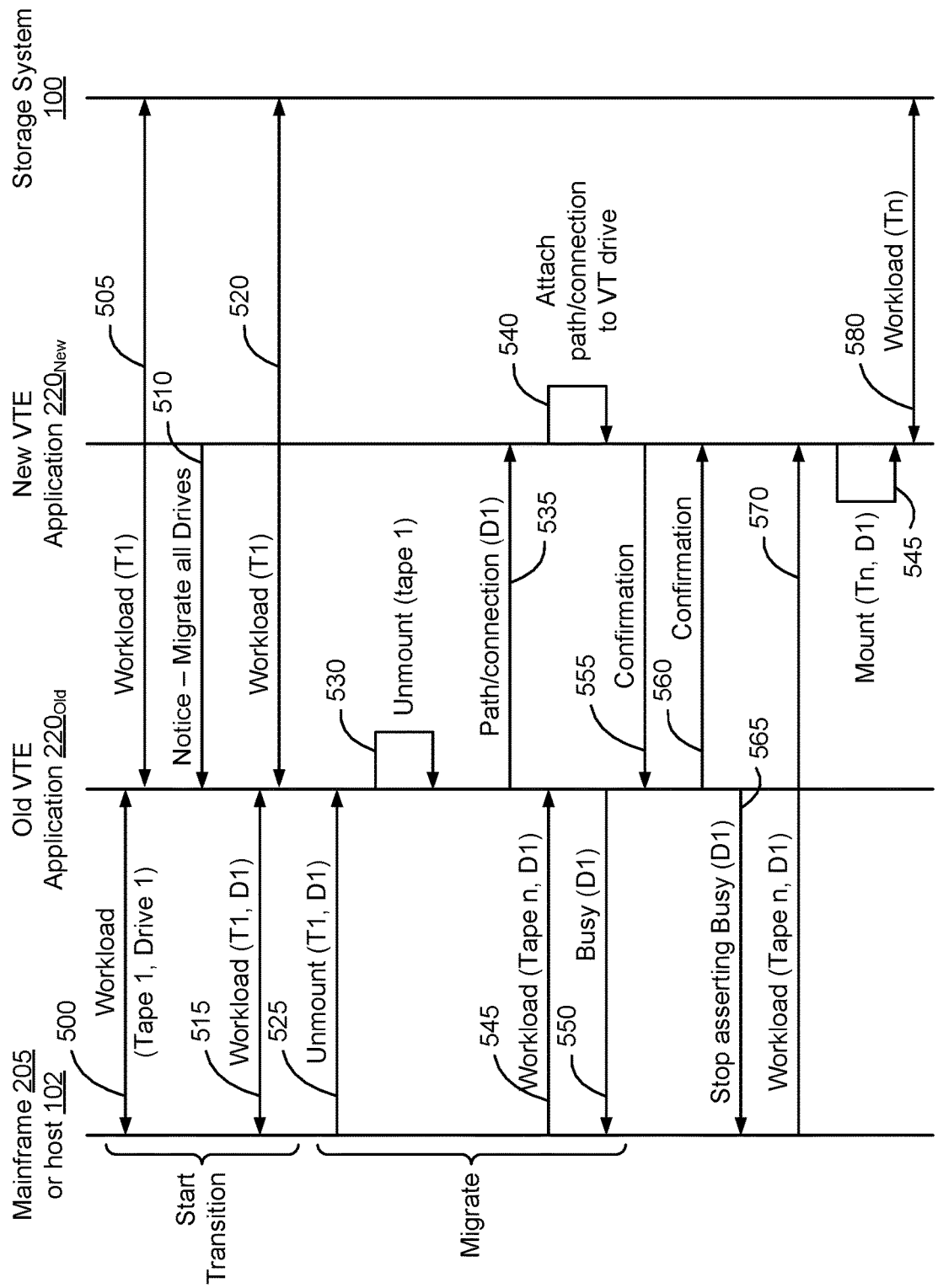
FIG. 5 is a swim-lane diagram showing an example process of migrating a virtual tape drive between instances of a virtual tape emulation application in a non-disruptive manner, according to some embodiments.

FIG. 5 is a swim-lane diagram showing an example process of migrating a virtual tape drive between instances of a VTE application in a non-disruptive manner, according to some embodiments. The process shown in FIG. 5 includes example signaling associated with starting the transition of virtual tape drives from an old VTE application $220_{Old}$ to a new VTE application $220_{New}$ (arrows 500-520), as well as example signaling associated with migration of one virtual tape drive from the old VTE application $220_{Old}$ to the new VTE application $220_{New}$ (arrows 525-580). It should be understood that the old VTE application $220_{Old}$ might be responsible for hundreds of virtual tape drives and, accordingly, the migration process (arrows 525-580) would be individually iterated for each of the individual virtual tape drives until all virtual tape drives had been migrated from the old VTE application $220_{Old}$ to the new VTE application $220_{New}$.

As shown in FIG. 5, initially, a set of one or more customer mainframes 205 is issuing workload on a set of virtual tapes mounted to a set of virtual tape drives. In this instance, the workload from one of the customer mainframes 205 is on a particular virtual tape (Tape 1 or T1) that is loaded (mounted) to virtual tape drive 1 (Drive 1 or D1). The customer mainframe 205 issues the workload on tape 1 (arrow 500) which is received by virtual tape drive 1 on old VTE application $220_{Old}$ and implemented on a storage system (arrow 505).

A new instance of VTE application is started and provided with configuration information 305 from the old VTE application $220_{Old}$ to enable the new VTE application $220_{New}$ to have the same configuration as the old VTE application $22001d$. Example configuration information might include, for example, causing the new VTE application $220_{New}$ to create the same number of devices as the old VTE application $220_{Old}$ so that the new VTE application $220_{New}$ is able to assume responsibility for all of the virtual tapes.

The VTE application migration engine 320, or another construct within virtual tape emulator 210, issues a transition notice (arrow 510) to migrate device management processes for all virtual tape drives from the old VTE application $220_{Old}$ to the new VTE application $220_{New}$. FIG. 5 shows the transition notice (arrow 510) as being sent from the new VTE application $220_{New}$ to the old VTE application $220_{Old}$. Alternatively, the transition notice might be sent to both the old VTE application $220_{Old}$ and the new VTE application $220_{New}$ by a management application or other control process.

In FIG. 5, it is assumed that virtual tape 1 is currently mounted to virtual tape drive 1 and that the old VTE application $220_{Old}$ is processing workload on virtual tape 1. Accordingly, after receipt of the transition notice (arrow 510) the old VTE application $220_{Old}$ continues to process workload on virtual tape 1 (arrow 515), and implements the workload on storage system (arrow 520).

Migration of virtual tape drive 1 starts when the customer mainframe 205 issues an unmount instruction to the old VTE application $220_{Old}$ instructing the old VTE application $220_{Old}$ to unmount virtual tape 1 from virtual tape drive 1 (arrow 525). Upon receipt of the unmount instruction (arrow 525) the old VTE application $220_{Old}$ will unmount the virtual tape 1 from virtual tape drive 1 in a normal manner (block 530). Normally, if the old VTE application $220_{Old}$ received a subsequent instruction to mount another tape to virtual tape drive 1, the old VTE application $220_{Old}$ would mount the requested virtual tape to virtual tape drive 1 and implement the workload on the storage system 100. However, according to some embodiments, once a transition notice has been received, the old VTE application $220_{Old}$ will not mount a virtual tape to any virtual tape drive once the old VTE application $220_{Old}$ has received an instruction to migrate all virtual tape drives. Rather, if the old VTE application $220_{Old}$ receives an instruction to mount a virtual tape to a virtual tape drive after migration of the device management process has been started, and before migration of the device management process has been completed, the (arrow 545), the old VTE will respond to the customer mainframe 205 with a Busy status for any incoming channel request (arrow 550). The old VTE application $220_{Old}$ will respond to the customer mainframe 205 with a Busy status for any incoming channel request until the old and new VTE applications have confirmed transfer of the device management process for the virtual tape drive from the old VTE application $220_{Old}$ to the new VTE application $220_{New}$ (arrows 555, 560).

To migrate responsibility (device management process) for a virtual tape drive from the old VTE application $220_{Old}$ to the new VTE application $220_{New}$, when the virtual tape is unmounted from the virtual tape drive, the old VTE application $220_{Old}$ will transfer the path/connection information 310 associated with the virtual tape drive, that the old VTE application $220_{Old}$ uses to communicate with a virtual tape driver 315 for the virtual tape drive, to the new VTE application $220_{New}$ (arrow 535). The new VTE application $220_{New}$ will attach the path and connection information to one of its devices (arrow 540) and send a confirmation message to the old VTE application $220_{Old}$ (arrow 555). The old VTE application $220_{Old}$ sends a confirmation message to the new VTE application $220_{New}$ (arrow 560) to confirm that the new VTE application $220_{New}$ is responsible for the virtual tape drive and that the old VTE application $220_{Old}$ will stop responding to channel messages and stop polling on the path/channel associated with the virtual tape drive that has been migrated. At this point, if the old VTE had previously responded to the customer mainframe 205 with a status of Busy for virtual tape drive 1 (arrow 550) the old VTE application $220_{Old}$ will stop asserting busy on virtual tape drive 1 (arrow 565). Because the migration process would be expected to be on the order of seconds, it would be expected to be unusual for the old VTE application $220_{Old}$ to need to assert Busy for an extended period of time in connection with migrating virtual tape drives to the new VTE application $220_{New}$.

Workload from the customer mainframe 205 associated with virtual tape drive 1 that is received after migration of responsibility for virtual tape drive 1 from old VTE application $220_{Old}$ to new VTE application $220_{New}$ will be sent by the device driver 315 to the path/channel associated with the virtual tape drive, which now points to a device on the new VTE application $220_{New}$ (arrow 570). Upon receipt of a mount instruction or upon receipt of workload on the virtual tape drive, the new VTE application $220_{New}$ mounts the requested virtual tape to the migrated virtual tape drive (arrow 575) and implements the workload on storage system 100 (arrow 580).

In some embodiments, when an "old" virtual device (virtual tape drive) gets notified about the need to migrate IO to new application instance, the old virtual device continues its IO processing for currently mounted tape (if any). Once a virtual tape gets unmounted, the migration process for the virtual tape drive can be started. The "Old" device transfers information about its established paths and connections to a corresponding virtual device of the new VTE application instance $220_{New}$. Until the "old" device gets transfer confirmation from the "new" device it responds with Busy status for any incoming channel request. Once the "old" device receives the transfer confirmation, it stops processing channel packets or even polling them. Then the old device sends another confirmation back to the "new" device.

Once the "new" virtual device receives all path information, it confirms the transfer and waits for a confirmation from the "old" device that it stopped processing of channel messages. Then the "new" device starts using those paths as active ones to poll channel packets. Subsequently, the "new" device continues IO processing for same path/connection (e.g., CU/UA) pair using the same paths and connections as the "old" device did. Since that moment virtual device management is migrated from old VTE application instance $220_{Old}$ to the new VTE application instance $220_{New}$. And that migration process was performed seamlessly to the customer mainframe 205. Once all device pairs have transferred virtual device management to the new VTE application instance $220_{New}$, the old application instance $220_{Old}$ will not be responsible for processing any IOs. Accordingly, the old application instance can be turned off and all IO are processed by the new VTE application instance $220_{New}$. All of the virtual tape drives are therefore able to be transferred from the old VTE application $220_{Old}$ to the new VTE application $220_{New}$ without disabling IO processing at the customer mainframe 205.

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible non-transitory computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A non-transitory tangible computer readable storage medium having stored thereon a computer program for updating a Virtual Tape Emulation (VTE) application in a non-disruptive manner, the computer program including a set of instructions which, when executed by a computer, cause the computer to perform a method comprising the steps of:

receiving a transition notice by a first instance of the virtual tape emulation application instructing the first instance of the virtual tape emulation application to transfer device management processes for a set of virtual tape drives to a second instance of the virtual tape emulation application;

for each virtual tape drive:
   determining if a virtual tape has been mounted to the virtual tape drive;
   when a virtual tape has not been mounted to the virtual tape drive, transferring a respective device management process for the virtual tape drive from the first instance of the virtual tape emulation application to the second instance of the virtual tape emulation application;
   when a virtual tape has been mounted to the virtual tape drive, continuing to process workload on the virtual tape that has been mounted to the virtual tape drive by the first instance of the virtual tape emulation application;
   determining by the first instance of the virtual tape emulation application that the virtual tape has been unmounted from the virtual tape drive; and
   when the virtual tape has been unmounted to the virtual tape drive, transferring a respective device management process for the virtual tape drive from the first instance of the virtual tape emulation application to the second instance of the virtual tape emulation application;
determining that device management processes for all virtual tape drives have been transferred from the first instance of the virtual tape emulation application to the second instance of the virtual tape emulation application; and
in response to determining that device management processes for all virtual tape drives have been transferred from the first instance of the virtual tape emulation application to the second instance of the virtual tape emulation application, shutting down the first instance of the virtual tape emulation application.

2. The non-transitory tangible computer readable storage medium of claim 1, wherein transferring a respective device management process for a respective virtual tape drive from the first instance of the virtual tape emulation application to the second instance of the virtual tape emulation application comprises transmitting respective path and connection information for the respective virtual tape drive from the first instance of the virtual tape emulation application to the second instance of the virtual tape emulation application.

3. The non-transitory tangible computer readable storage medium of claim 2, wherein the respective path and connection information comprises information used by the device management process for the respective virtual tape drive to communicate with a respective device driver associated with the virtual tape drive in an operating system.

4. The non-transitory tangible computer readable storage medium of claim 1, wherein transferring the respective device management process for the virtual tape drive from the first instance of the virtual tape emulation application to the second instance of the virtual tape emulation application comprises:
   initiating transfer of the respective device management process for the virtual tape drive by the first instance of the virtual tape emulation application; and
   receiving confirmation of transfer of the respective device management process for the virtual tape drive, by the first instance of the virtual tape emulation application, from the second instance of the virtual tape emulation application.

5. The non-transitory tangible computer readable storage medium of claim 4, further comprising:
   receiving a mount request from a host, by the first instance of the virtual tape emulation application, to mount a virtual tape to the respective virtual tape drive, the mount request being received after initiating transfer of the respective device management process for the virtual tape drive and before receiving confirmation of transfer of the respective device management process for the virtual tape drive; and
   responding with a busy status to the host.

6. The non-transitory tangible computer readable storage medium of claim 5, further comprising receiving confirmation of transfer of the respective device management process for the virtual tape drive; and
   stop responding with the busy status to the host.

7. A virtual tape emulator, comprising:
an operating system;
a first instance of a virtual tape emulation application executing in the context of the operating system, the first instance of the virtual tape emulation application including a plurality of device management processes for a set of virtual tape drives;
a second instance of a virtual tape emulation application executing in the context of the operating system;
the first instance of the virtual tape emulation application having a virtual tape emulation application migration engine containing control logic configured to:
   receive a transition notice by a first instance of the virtual tape emulation application instructing the first instance of the virtual tape emulation application to transfer the device management processes for the set of virtual tape drives to the second instance of the virtual tape emulation application;
   for each virtual tape drive:
      determine if a virtual tape has been mounted to the virtual tape drive;
      when a virtual tape has not been mounted to the virtual tape drive, transfer a respective device management process for the virtual tape drive from the first instance of the virtual tape emulation application to the second instance of the virtual tape emulation application;
      when a virtual tape has been mounted to the virtual tape drive, continue to process workload on the virtual tape that has been mounted to the virtual tape drive by the first instance of the virtual tape emulation application;
      determining by the first instance of the virtual tape emulation application that the virtual tape has been unmounted from the virtual tape drive; and
      when the virtual tape has been unmounted to the virtual tape drive, transfer the respective device management process for the virtual tape drive from the first instance of the virtual tape emulation application to the second instance of the virtual tape emulation application;
   determine that device management processes for all virtual tape drives have been transferred from the first instance of the virtual tape emulation application to the second instance of the virtual tape emulation application; and
   in response to determining that device management processes for all virtual tape drives have been transferred from the first instance of the virtual tape emulation application to the second instance of the virtual tape emulation application, cause the first instance of the virtual tape emulation application to terminate.

8. The virtual tape emulator of claim 7, wherein the control logic configured to transfer a respective device management process for a respective virtual tape drive from the first instance of the virtual tape emulation application to the second instance of the virtual tape emulation application comprises control logic configured to transmit respective path and connection information for the respective virtual tape drive from the first instance of the virtual tape emulation application to the second instance of the virtual tape emulation application.

9. The virtual tape emulator of claim 8, wherein the respective path and connection information comprises information used by the device management process for the respective virtual tape drive to communicate with a respective device driver associated with the virtual tape drive in the operating system.

10. The virtual tape emulator of claim 7, wherein the control logic configured to transfer the respective device management process for the virtual tape drive from the first instance of the virtual tape emulation application to the second instance of the virtual tape emulation application comprises:
   control logic configured to initiate transfer of the respective device management process for the virtual tape drive by the first instance of the virtual tape emulation application; and
   control logic configured to receive confirmation of transfer of the respective device management process for the virtual tape drive, by the first instance of the virtual tape emulation application, from the second instance of the virtual tape emulation application.

11. The virtual tape emulator of claim 10, further comprising:
   control logic configured to receive a mount request from a host, by the first instance of the virtual tape emulation application, to mount a virtual tape to the respective virtual tape drive; and
   when the mount request is received after control logic has initiated transfer of the respective device management process for the virtual tape drive and before the control logic has received confirmation of transfer of the respective device management process for the virtual tape drive, the control logic is further configured to respond to the mount request with a busy status.

12. The virtual tape emulator of claim 11, wherein the control logic is further configured to stop responding with the busy status to the host after receipt of confirmation of transfer of the respective device management process for the virtual tape drive.

13. The virtual tape emulator of claim 7, wherein the second instance of the virtual tape emulation application containing control logic configured to:
   receive respective path and connection information for the respective virtual tape drive from the first instance of the virtual tape emulation application;
   apply the path and connection information for the respective virtual tape drive to a device; and
   use the path and connection information to process workload on the respective virtual tape drive before the first instance of the virtual tape emulation application terminates.

14. A method of updating a Virtual Tape Emulation (VTE) application in a non-disruptive manner, comprising:
   receiving a transition notice by a first instance of the virtual tape emulation application instructing the first instance of the virtual tape emulation application to transfer device management processes for a set of virtual tape drives to a second instance of the virtual tape emulation application;
   for each virtual tape drive:
      determining if a virtual tape has been mounted to the virtual tape drive;
      when a virtual tape has not been mounted to the virtual tape drive, transferring a respective device management process for the virtual tape drive from the first instance of the virtual tape emulation application to the second instance of the virtual tape emulation application;
      when a virtual tape has been mounted to the virtual tape drive, continuing to process workload on the virtual tape that has been mounted to the virtual tape drive by the first instance of the virtual tape emulation application;
      determining by the first instance of the virtual tape emulation application that the virtual tape has been unmounted from the virtual tape drive; and
      when the virtual tape has been unmounted to the virtual tape drive, transferring a respective device management process for the virtual tape drive from the first instance of the virtual tape emulation application to the second instance of the virtual tape emulation application;
   determining that device management processes for all virtual tape drives have been transferred from the first instance of the virtual tape emulation application to the second instance of the virtual tape emulation application; and
   in response to determining that device management processes for all virtual tape drives have been transferred from the first instance of the virtual tape emulation application to the second instance of the virtual tape emulation application, shutting down the first instance of the virtual tape emulation application.

15. The method of claim 14, wherein transferring a respective device management process for a respective virtual tape drive from the first instance of the virtual tape emulation application to the second instance of the virtual tape emulation application comprises transmitting respective path and connection information for the respective virtual tape drive from the first instance of the virtual tape emulation application to the second instance of the virtual tape emulation application.

16. The method of claim 15, wherein the respective path and connection information comprises information used by the device management process for the respective virtual tape drive to communicate with a respective device driver associated with the virtual tape drive in an operating system.

17. The method of claim 14, wherein transferring the respective device management process for the virtual tape drive from the first instance of the virtual tape emulation application to the second instance of the virtual tape emulation application comprises:
   initiating transfer of the respective device management process for the virtual tape drive by the first instance of the virtual tape emulation application; and
   receiving confirmation of transfer of the respective device management process for the virtual tape drive, by the first instance of the virtual tape emulation application, from the second instance of the virtual tape emulation application.

18. The method of claim 17, further comprising:
receiving a mount request from a host, by the first instance of the virtual tape emulation application, to mount a virtual tape to the respective virtual tape drive, the mount request being received after initiating transfer of the respective device management process for the virtual tape drive and before receiving confirmation of transfer of the respective device management process for the virtual tape drive; and responding with a busy status to the host.

19. The method of claim 18, further comprising receiving confirmation of transfer of the respective device management process for the virtual tape drive; and stop responding with the busy status to the host.

* * * * *